United States Patent [19]
Saner

[11] Patent Number: 5,095,764
[45] Date of Patent: Mar. 17, 1992

[54] FORCE TRANSDUCER AND METHOD OF MANUFACTURING SAME

[75] Inventor: Kaspar Saner, Dübendorf, Switzerland

[73] Assignee: K-Tron Technologies, Inc., Wilmington, Del.

[21] Appl. No.: 536,005

[22] Filed: Jun. 8, 1990

[30] Foreign Application Priority Data

Jun. 8, 1989 [CH] Switzerland .................. 2152/89

[51] Int. Cl.$^5$ ..................... G01L 1/10; G01G 3/16
[52] U.S. Cl. ..................... 73/862.59; 177/210 FP
[58] Field of Search ........... 73/862.59, 862.62, 862.64; 177/210 FP

[56] References Cited

U.S. PATENT DOCUMENTS 4,541,495  9/1985  Willi et al. .
4,856,350  8/1989  Hanson .
4,914,963  4/1990  Sabiron .................. 73/862.59

FOREIGN PATENT DOCUMENTS 0318152  5/1989  European Pat. Off. .
539270   8/1973  Switzerland .
550459   6/1974  Switzerland .
609983   5/1978  U.S.S.R. .
1167452A 7/1985  U.S.S.R. .
2142430  1/1985  United Kingdom .
2190748 11/1987  United Kingdom .

OTHER PUBLICATIONS

Japanese Unexamined Patent Publication (Kokai) No. 61-194325, "Force Converting Mechanism", Publication Date: 8/28/86–Denshi et al. w/translation.
Extract from "Lueger Lexikon Der Technik", 1961.

Primary Examiner—Charles A. Ruehl
Attorney, Agent, or Firm—Oliff & Berridge

[57] ABSTRACT

A force transducer includes a force transmitting mechanism comprising a reference member which is stationary during measurement, a force input member and two holders adapted to hold a transducing element and to apply a force thereto at least approximately perpendicular to the force applied to the force input member. The force transmitting mechanism comprises two spaced, metallic plate members connected with each other at the holders by electrically insulating pins forming part of the holders. Eyelets of the electrically conducting transducing element are fixedly held by the holder pins.

19 Claims, 4 Drawing Sheets

FORCE TRANSDUCER AND METHOD OF MANUFACTURING SAME

BACKGROUND OF THE INVENTION

1. Field of the Invention

The present invention relates in general to transducers for converting a force into an electrical signal and methods of manufacturing same, and in particular to force transducers wherein force transmitting apparatus applies a force related to an input force at two spaced points of application to a transducing element.

2. Description of the Prior Art

Force transducers of this type may be used, for example, for transducing and measuring a force transmitted from the load carrying member of a scale, such as for a metering or proportioning system, to the force input of the force transducer. The metering system may comprise, for example, a conveyor belt adapted to convey metered materials, and a conveyor type scale having a load carrying member adapted to have the conveyor belt move on it. However, the force transducer may also be used in conjunction with a so-called gravimetric metering system, in which the material to be metered is conveyed by a conveyor screw or worm, or other type of conveyor member, away from and/or out of a material storage device, and the weight loss of the storage device is then determined using a weighing scale to control the rate at which the material is conveyed.

One type of force transducer having a force transmitting apparatus and an elongated transducing element responsive to the transmitted force applied at two points of application is disclosed in published Japanese patent application Sho-61-194 325 of Nishiguchi, and in European patent application 0 318 152 and the corresponding U.S. Pat. No. 4,856,350 to Hanson. As disclosed in the Nishiguchi reference, the force transducer has a rhombic or elliptical frame having at two opposing rhomb corners/ellipse vertices, a reference member fixedly mounted on a base or the like, and a movable force input member to which the input force is applied. At the two other rhomb corners/ellipse vertices, holders are provided which are adapted to hold the transducing element on the frame The holders are connected slightly movably to the reference member and the force input member by the legs of the frame, which constitute transmitting links. The ends of the transmitting links are constituted, each constriction forming a bending articulation or joint. The transducing element consists of a force detection vibrator, the exemplary form of which comprises a double-tuning-fork-shaped vibrator having two elongated tines mutually connected at their two ends by a web, and two piezoelectric elements mounted on the side faces of on of the connecting webs at the bases of the tines. The frame, the holders and the vibrator are built as sections of a single-piece plate member. The Hanson references disclose the same rhombic form of transducer, which utilizes one or two elongated vibratable tines. The FIG. 6 and 8 embodiments are integrally formed from a single plate-like member. The FIG. 6 embodiment has the same tine construction as the Nishiguchi transducer and includes suitable electrodes mounted on the tines for vibrating the tines. In the FIG. 8 embodiment, the tines are connected at their ends by enlarged, generally triangular web members which are connected to the frame by short connecting links, and the mounting pads are elongated to extend over a majority of the length of the frame. The Nishiguchi force transducer has its plate member made of metal, while the FIG. 6 and 8 embodiments of the Hanson force transducer are made of quartz. Both the Nishiguchi and Hanson transducers are electrically connected with an electronic device.

This type of conventional transducer suffers from a number of disadvantages. When operating this type of force transducer, a pressing force is applied to the force input member, which pushes the force input member against the reference member, resulting in the transducing element holders being pushed away from each other and the holders exerting a tension force on the transducing element. However, the pressing force acting at the reference member and the force input member tends to generate bending and/or torsional deformations that will bend certain regions of the frame in an undefined manner, outwardly from the plane defined by the resting frame, and/or may even buckle, the frame, resulting in false measurements and possibly permanent damage to the transducer.

The Nishiguchi plate members are relatively thick, of the order of several millimeters, presumably to the undesirable bending and torsional deformations just described. The vibrator and other movable parts of the Nishiguchi transducer thus have comparatively large masses in relation to the length of the vibratable tines. However, movable parts having large masses are disadvantageous because during measurement they are very sensitive to external shocks and disturbances. Thus, a force transducer having such large mass movable parts which is exposed, for example, during transportation or in conjunction with work on a system with which the force transducer is used, to powerful external shocks or disturbances could easily become damaged. Furthermore, if the plate members are thick, it becomes difficult to produce narrow weblike sections, which are desirable, for example, for forming the bending joints and vibrator tines of the force transducer. According to the aforementioned Nishiguchi reference, both the force transmitting device and the vibrator are cut out of a solid metallic plate member by spark erosion. Contour cutting a plate member several millimeters thick by spark erosion is, however, difficult and time consuming.

Figure 6:
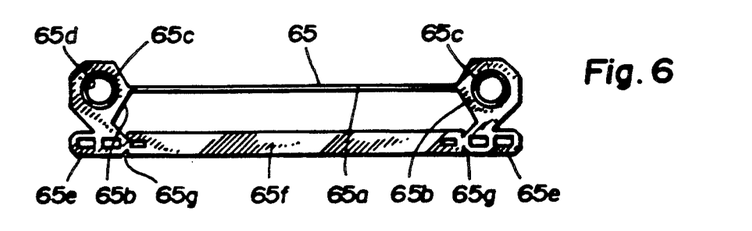
FIG. 6 is a plan view of the transducing element of FIG. 1 viewed in the same direction and drawn to the same scale as FIG. 3, the transducing element being shown as made of one piece with an auxiliary connecting web which is removed after assembly.
Figure 8:
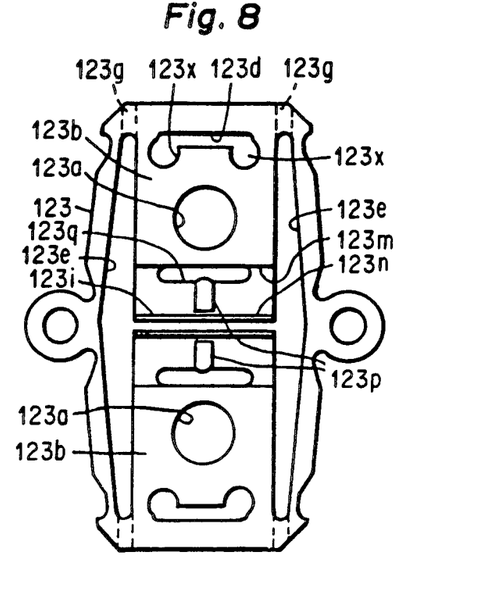
FIG. 8. is a plan view of a second embodiment of the force transmitting mechanism of the invention, viewed from the surface facing toward the transducing element.

According to FIGS. 6 and 8 of the aforementioned Hanson European patent disclosure, the maximum dimension of the illustrated plate members as measured parallel to the longitudinal direction of the vibrator is approximately 10 mm or 12 mm, respectively, and the thickness of the plate members is approximately 0.15 mm and 0.25 mm, respectively. It is very doubtful whether it would be possible with so dimensioned plate members to prevent undesirable bending and torsional deformations from occurring which cause sections of the plate members to move out of the rest state planes defined by the plate members. In addition, it is complicated and expensive to cut a force transmitting device and a vibrator having the shapes shown, out of a solid quartz crystal.

Further, in the Nishiguchi and Hanson force transducers, the piezo-electric element/electrodes applied to the vibrator and the electrical conductors connected with the electronic device can disturb the vibrations of the vibrator, and thus reduce measurement accuracy. In addition, the vibrators of these known force transducers are believed to be closely coupled vibrationally with the force transmitting device, with the effect that during measurement the vibrations of the vibrator will be dampened to a great extent, and the measurement accuracy reduced.

Another conventional force transducer is disclosed in U.S. Pat. No. 4,541,495 to Willi et al which comprises a frame stationary during measurement and serving as a reference member, and a two-armed spring-mounted lever pivotably supported on the frame to receive and transmit the force to be measured. That is, the lever serves as the force input member and force transmitting device. A transducing element consists of a metallic, electrically conducting string having nodal masses and connected at one end with the frame by a holder, and at its other end with the lever by another holder. Each holder comprises a locking screw and a clamping jaw fastened to the frame and the lever, respectively. Further, the frame has a magnet fastened thereon which is adapted to generate a magnetic field in the central region of the string. The ends of the string extend past the holders and are connected with an electronic device adapted to supply a current through the string during measurement. If the frame and the lever are made of metal, the holders would also need to be provided with insulators to electrically insulate the string ends with respect to the frame and the lever. The Willi et al force transducer has the disadvantage of comprising a relatively large number of components having many different configurations. The manufacture and assembly of such a force transducer is thus very elaborate. Furthermore, the Willi et al force transducer has the string holders fastened only at one of their sides on the frame and at the end of one of the arms of the lever, respectively. Since the lever must transmit a force to the string, and since this string is subjected to tension stress, the frame, the lever and the holders must have comparatively large bending moments. The frame, the lever and the holders must therefore have high strength and must have, in comparison to the length of the string, large dimensions, thus increasing the space requirements of the transducer. The lever and the holder mounted on the lever thus also have large dimensions. As noted above, movable parts with large masses are undesirable.

SUMMARY OF THE INVENTION

It is therefore a primary object of the invention to provide a force transducer which avoids the disadvantages of conventional force transducers. Specifically, it is an object of the invention to make the dimensions of the movable parts of the force transmitting mechanism preferably small as compared to the largest dimension of the transducing element, while still achieving sufficient resistance against bending and torsional and buckling deformations, which would cause parts of the force transmitting mechanism to become deformed in unwanted directions.

Another object of the invention is to enable an electrically conducting transducing element to be held electrically insulated by the holders. More specifically, it is an object of the invention to provide a simple transducing element arrangement comprising a vibratable string and magnets for generating a magnetic field crossing the string.

Another object of the invention is to provide a simple, efficient and economical way of producing the force transducer and particularly its force transmitting mechanism.

The foregoing and other objects of the invention are attained in accordance with one aspect of the invention by the provision of a force transducer wherein its force transmitting mechanism comprises two single-piece plate members in spaced, parallel relation to each other and connected together at predetermined locations, with each of the plate members comprising separate sections respectively associated with a force input member, each of the transducing element holders, and each of a plurality of transmitting links.

In accordance with another aspect of the invention, the force transducer is simply, efficiently and economically manufactured by producing each plate member from a solid sheet-metal part by either etching or stamping, and the two plate members are subsequently connected, in spaced relation, with each other and with the transducing element disposed between them.

In accordance with a further aspect of the invention, the transducing element preferably comprises an elongated main section constituting a string held in place by the force transmitting mechanism, and magnetic means for generating at least one magnetic field crossing the string so that the string vibrates during measurement at one of its resonant frequencies, such as its second natural frequency. This frequency is proportional to the square root of the stretching or tensioning force acting at the ends of the string. This force has two components, a constant force component generated by applying to the string an initial tension, or pretension; and a variable force component proportional to the input force applied to the string by the input member of the force transmitting mechanism. An electronic device electrically connected with the two ends of the string is adapted to cause the string to vibrate, and to calculate a variable related to the frequency of vibration of the string, for example the time duration of a period of vibration; or alternatively, a group of such variables. This variable will then represent a measure of the tensioning or stretching force acting on the string and, at the same time, of the input force, related to the tensioning force, as exerted upon the force input member.

Instead of using a string vibrating during measurement, it is possible to use an electrically conducting straight wire as the transducing element which, when elastically stretched by a variable tension force applied at its ends would have its electrical resistance correspondingly changed. The instantaneous electrical resistance is applied to a circuit to generate an electrical signal having a characteristic the value of which corresponds to the applied input force. As an alternative, the transducing element advantageously is an elongated elastically stretchable carrier member having a strain gage mounted thereon. As a further alternative, the transducing element advantageously is a piezoelectric crystal, or the like, provided with electrodes. Such a transducing element is mounted and held so as to generate an electrical signal in response to compression forces acting at the two holders.

In accordance with a still further aspect of the invention, the force transmitting mechanism preferably comprises a reference member, a force input member movable with respect to the reference member, and first and second transmitting links movably connecting one of the transducing element holders with the reference member and force input member, respectively, such that a change in distance between respective first ends of the transmitting links remote from the holder causes a change in the distance between the holders. Bending articulations or joints are provided at the ends of the transmitting links such that, in every instance, the force input member, force transmitting links and at least one of the holders engaging the transducing element at points of application are movable in relation to the reference member. If a string is used as the transducing element held by the force transmitting device, then the displacements effected during force measurement by the force input member and by the point or points of application will be very small, in fact very much smaller than the distance between the two points of application of force to the transducing element, and, similarly, very much smaller than the distance between the two joints of one of the transmitting links. In a practical implemented embodiment, any changes in the distance between the two points of application which take place when measuring forces are within a predetermined range of magnitudes are normally less than 0.2%, or even less than 0.1%, of the distance between the two points of application. Thus, the relative displacements of the various members of the force transmitting mechanism and the displacements relative t0 the reference member are more properly considered to be "theoretical" or "virtual". For this reason, transducers having vibrating strings as transducing members are often referred to as rigid transducers, or as transducers operating with "no displacements". Similarly, transducer embodiments using as transducing elements straight, elastically stretchable wires undergoing changes in electrical resistance when stretched, as well as those comprising piezoelectric elements, equally operate with "no displacements". Also, a transducer working with a strain gage mounted on an elastically stretchable carrier member is similarly subjected during measurement to very small displacements and may also be considered as operating with "no displacements".

These and other objects, features and advantages of the present invention are disclosed in or apparent from the following detailed description of preferred embodiments.

BRIEF DESCRIPTION OF THE DRAWINGS

The preferred embodiments will be described with reference to the appended drawing, in which.

DETAILED DESCRIPTION OF THE PREFERRED EMBODIMENTS

Figure 1:
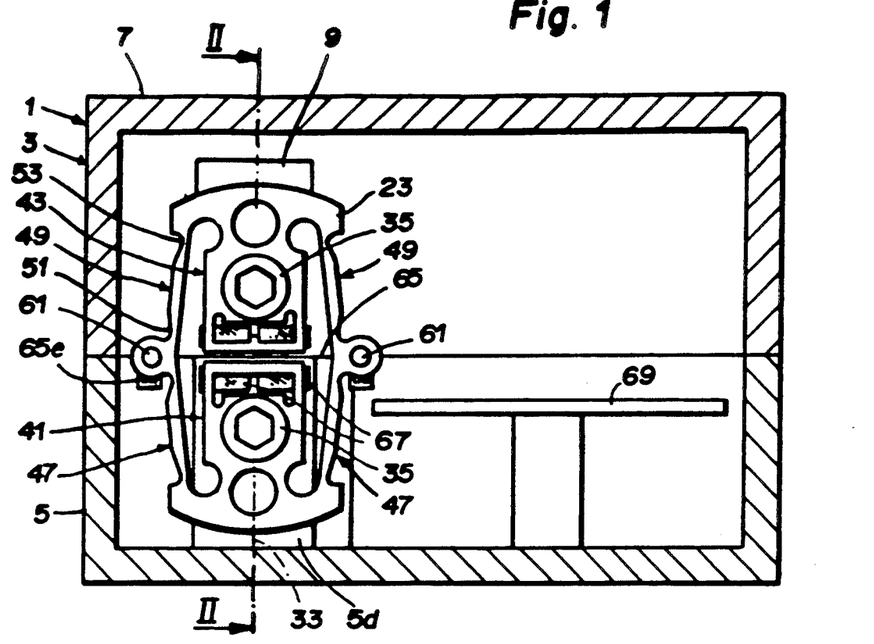
FIG. 1 is a simplified cross-sectional view of an embodiment of the force transducer of the invention, showing a force transmitting mechanism and a transducing element associated therewith.
Figure 2:
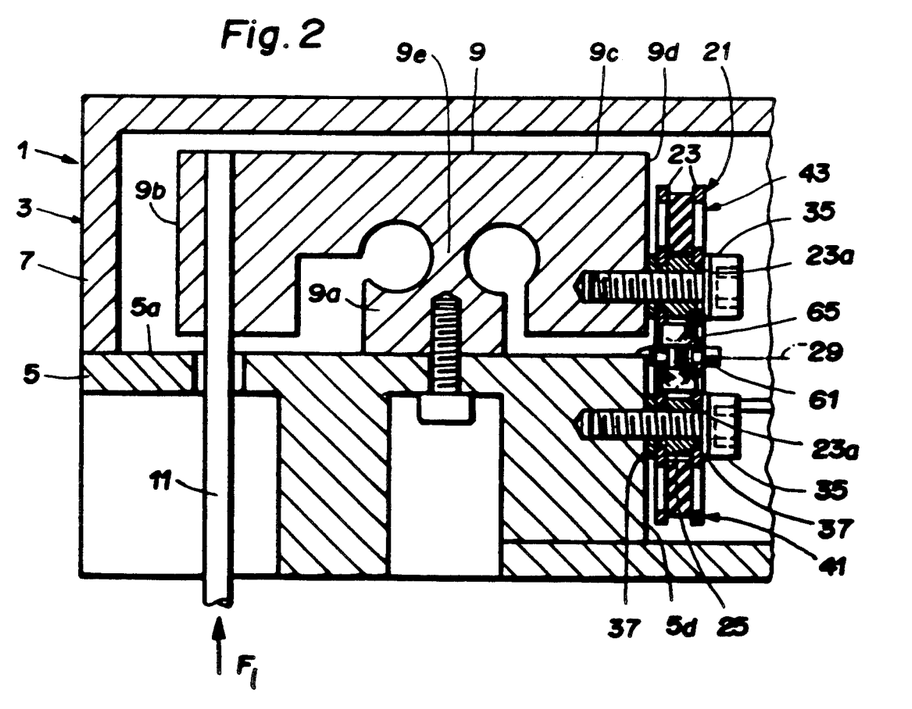
FIG. 2 is a partial cross-section through the force transducer of FIG. 1 viewed perpendicular to the line II—II of FIG. 1.

In use, the force transducer 1 shown in FIGS. 1 and 2 comprises a component fixedly mounted to a frame or a housing of a scale not shown in the drawing. Transducer 1 comprises an enclosed housing 3 having a lower part 5 and an upper part 7 releaseably fastened to lower part 5. Disposed within the interior of the transducer housing lower part 5 are a supporting surface 5a and a planar vertical carrier surface 5d. A one-piece force applying member 9 is configured as shown so as to comprise an intermediate bearing portion 9a resting on the supporting surface 5a and screw-fastened to the lower housing part 5, and a lever portion defining two lever arms 9b and 9c connected with the bearing portion 9a by a narrowed region 9e forming a bending articulation, or joint, for pivotable movement of lever arms 9b and 9c with respect to a horizontal axis. A load carrying member of the weighing scale not shown in the drawing is connected with the force applying member 9 of force transducer 1 through connecting and transmitting apparatus comprising a conventional lifting mechanism adapted to reduce or gear down the force applied to transducer 1. The lifting mechanism includes a connecting bar 11, which is shown in the drawing as projecting from below, up through a hole in the lower part of housing 3 into the interior thereof. Bar 11 is fixedly joined to lever arm 9b. The other lever arm 9c terminates at its free end with a planar vertical carrier surface 9d aligned with carrier surface 5d of the lower housing part 5.

Figure 3:
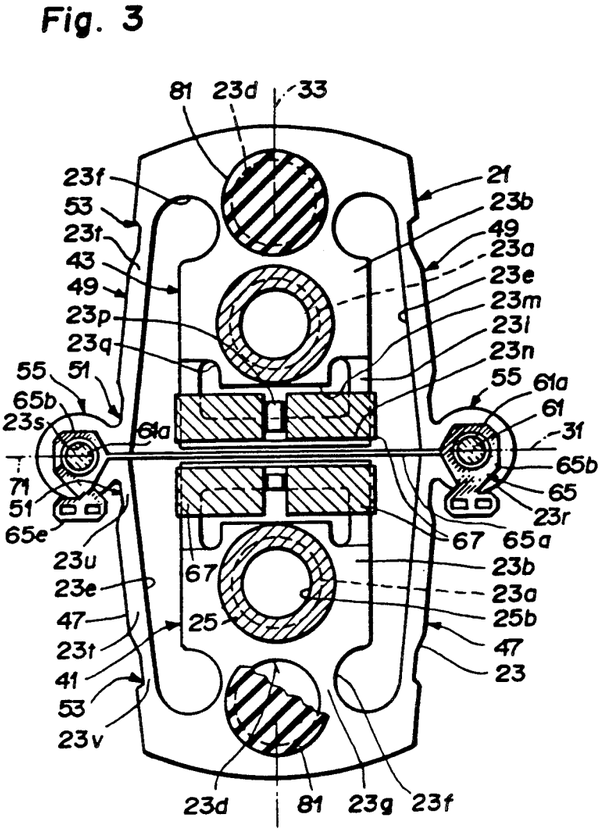
FIG. 3 is a partial, enlarged scale, cross-section of the force transmitting mechanism of FIG. 1 viewed in a plane passing between the two plate members of the force transmitting mechanism.
Figure 4:
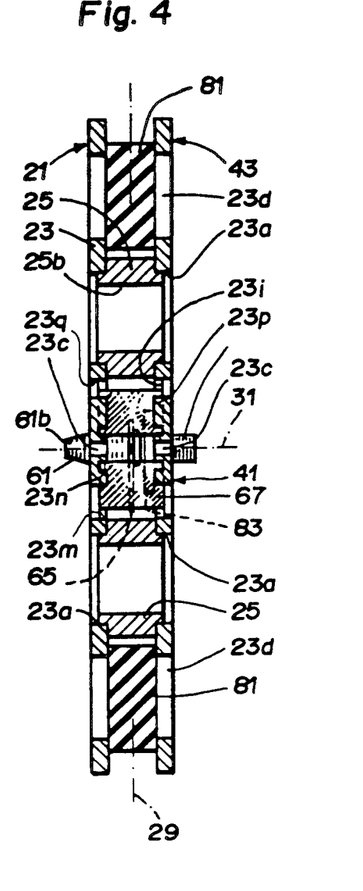
FIG. 4 is a partial cross-section, similar to that of FIG. 2, of the force transmitting mechanism of FIG. 1, drawn to the same scale as FIG. 3.
Figure 5:
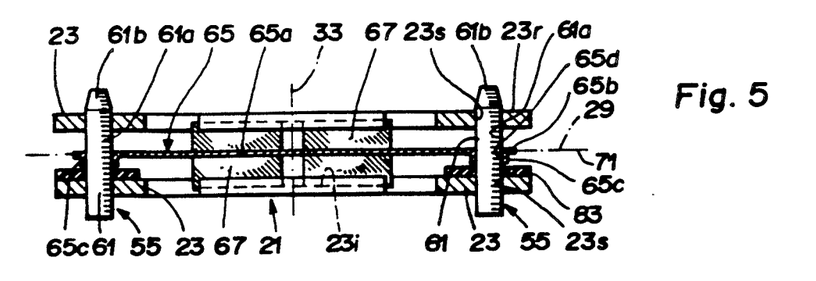
FIG. 5 is a cross-section through the force transmitting mechanism of FIG. 1 viewed perpendicular to the plane of FIGS. 3 and 4.

A force transmitting mechanism, generally denoted 21, is disposed inside housing 3. As shown in FIGS. 3, 4 and 5, force transmitting mechanism 21 comprises two plate members 23 having generally plane surfaces arranged parallel to and spaced from each other. As shown in FIGS. 3 and 4, plate members 23 are each provided with two holes 23a arranged so as to form two opposing pairs of holes aligned with each other. A spacer bushing 25 is disposed between the two plate members 23 adjacent to each opposed pair of holes 23a. Each spacer bushing 25 comprises an annular cylindrical central part, and at each end thereof a somewhat thinner collar penetrating into an associated one of the holes 23a with small radial play so as to provide a close fit. Each bushing 25 has planar radial shoulder surfaces provided at the transitions between the central part and the two collars of the bushing which abut against the respective opposing surfaces of the two plate members 23.

Plate members 23 have substantially identical configurations, including equal outer contours, and equal contour dimensions and thicknesses. Additionally, the two plate members 23 are disposed at least substantially, and preferably exactly in mirror-symmetrical relationship with respect to a vertical plane of symmetry 29 extending between the plate members. Also, plate members 23 ar at least substantially mirror-symmetrical with respect to two orthogonal transverse and longitudinal planes of symmetry 31 and 33 extending perpendicular to planes defined by the plate members. Symmetry planes 31 and 33 are horizontal and vertical, respectively, as will be explained below in more detail. The two spacer bushings 25 are mirror-symmetrical with respect to the horizontal plane of symmetry 31 and, furthermore, have their axes extending through the vertical plane of symmetry 33, so that each bushing 25 is mirror-symmetrical with respect to the plane of symmetry 33. Each of the through-going holes of the bushings 25 represents a mounting hole 25b. The force transmitting mechanism 21 is fixedly mounted on the lower housing part 5 and lever arm 9c by means of screws 35 extending through mounting holes 27b. Between the supporting surfaces 5d, 9d and the plate member 23 which is located nearer to these surfaces, washers 37 are provided through which screws 35 pass and serve to maintain the associated plate member 23 in spaced relationship to supporting surfaces 5d, 9d. Additional washers 37 are provided between the heads of screws 35 and the plate member 23 located further away from supporting surfaces 5d, 9d.

The middle sections 23b of plate members 23 that cross the vertical plane of symmetry 33 and contain holes 23a are mutually separated by a gap-like interspace 23c through which passes the horizontal plane of symmetry 31. Circular holes 23d are provided in each plate member 23 on the side of the holes 23a remote from interspace 23c. Furthermore, each plate member 23 is provided on both sides of the plane of symmetry 33 with an elongated slot-shaped opening 23e that extends over a major portion of the longest plate member dimension measured perpendicular to the plane of symmetry 31. As shown, each end of openings 23e is enlarged to form an enlargement 23f shaped as part of a circle. The respective openings 23d and adjacent enlargements 23f define therebetween relatively narrow webs 23g having constricted centers. On their opposing surfaces, between hole 23a and interspace 23c, plate members 23 are each provided with one recess 23i extending over the entire width of plate member section 23b and having a depth approximately equal to half the plate member thickness. Each recess 23i defines boundary, or stop or contact surfaces 23m and 23n facing toward each other and disposed parallel to the plane of symmetry 31. Each recess 23i has in its central region, i.e., at the vertical plane of symmetry 33, a spacer nose 23p of rectangular contour projecting away from the bottom of the recess and toward the opposed plate member, and which subdivides the recess 23i into two halves. The height of spacer nose 23p is about equal to the depth of the recess 23i. Plate members 23 are each provided in the region of recess 23i with an elongated hole 23q extending generally parallel to interspace 23c, the boundary of each hole 23q facing away from the plane of symmetry 31 and being at least substantially aligned or coincident with a part of the boundary of recess 23i which faces away from the plane of symmetry 31. The spacer nose 23p and hole 23q of each plate member 23 in a variant embodiment advantageously have a slightly different design above and below the plane of symmetry 31, in that the upper portion of spacer nose 23p is made somewhat longer and is configured to form a projection intruding into hole 23q. Apart from the optionally slightly different design of the noses 23p and holes 23q, the two plate members 23 are mirror-symmetrical with respect to the plane of symmetry 31, and fully mirror-symmetrical with respect to the plane of symmetry 33.

Each plate member 23 has on each of the outer longitudinal sides that face away from each other an eyelet 23r disposed in the plane of symmetry 31 and provided with a circular hole 23s. Each eyelet 23r is contiguous, i.e., connected with the associated marginal sections 23t of the corresponding plate member which are formed by the outer edge of the associated slot 23e and the outer longitudinal side of the plate member, and which extend away from each other on both sides of the plane of symmetry 31. Sections 23t, hereinafter referred to as webs 23t, are configured as shown to have an elongated leg or web shape with constricted end regions 23u and 23v. The inner side edges of regions 23u and 23v, which are formed by the outer side edge of the associated opening 23e, are straight edges, while the outer side edges of regions 23u and 23v constitute recesses in the associated outer side edge of the corresponding plate member 23, as shown.

As used hereinafter, the expression "aligned sections (or other member) of the two plate members 23" means those opposing plate member sections that coincide in a projection perpendicular to the planes of plate members 23. Thus in FIGS. 1 and 3, the lower two aligned sections 23b of the two plate members 23 that cross the vertical plane of symmetry 33, together with the associated spacing bushing 25, constitute the reference member 41 of the force transmitting mechanism 21 fixedly mounted on the lower part 5 of housing 3. The upper two aligned sections 23b of the two plate members 23 that cross the vertical plane of symmetry 33, together with their associated bushing 25, constitute the force input member 43 of force transmitting mechanism 21 fixedly fastened to force applying member 9. Each pair of lower aligned webs 23t of the plate members 23 constitutes an elongated leg-shaped or arm-shaped transmitting link 47. Each pair of upper aligned webs 23t of the plate members 23 constitutes an elongated leg-shaped or arm-shaped transmitting link 49. Each pair of aligned constricted regions 23u constitutes a bending joint 51 and each pair of aligned constricted regions 23v constitutes a bending joint 53. (Joints such as joints 51 and 53 are also referred to in the art as "virtual joints".) Bending joints 51 pivotably connect one of the respective ends of the four transmitting links 47, 49 with one pair of aligned eyelets 23r. Bending joints 53 connect the ends of the two transmitting links 47 remote from eyelets 23r with reference member 41, and the ends of the two transmitting links 49 remote from eyelets 49 with force input member 43. Joints 51, 53 enable pivoting movements of the transmitting links to take place in the planes of plate members 23, and thus around pivot axes perpendicular to those planes. The four transmitting links 47, 49 and the components connecting same together constitute a frame which is deformable within a plane defined by the frame.

The width of constricted regions 23u, 23v, at their narrowest section, as measured parallel to the planes of plate members 23, i.e. parallel to a plane defined by the plate members, and perpendicular to the longitudinal direction of webs 23t, is, for example, approximately equal to half of the maximum width of the webs 23t. The bending stiffness of webs 23t including the constricted regions 23u, 23v is proportional, for bending deformations along the planes of plate members 23, to the third power of the width. Thus, based on the stated ratio of widths, the bending stiffness of joints 51, 53 is approximately equal, for bending deformations along the plate member planes, to one eighth of the bending stiffness of the main, or unconstricted central section of webs 23t. It will be appreciated that the width of constricted regions 23u, 23v could also be made smaller than half of the maximum width of webs 23t.

Eyelets 23r thus serve as holding sections for holding pins 61. The combination of each pin 61 and the associated eyelets 23r in which pin 61 is mounted constitutes a holder 55. A single-piece pin 61, for example having a generally cylindrical shape with a tapered frustoconical end, as shown, is mounted, for example by press-fitting, in the aligned holes 23s of each pair of aligned eyelets 23r. A one-piece transducing element 65 comprises a string 65a and an eyelet 65b attached at both ends of string 65a. On the outside, each eyelet 65b configured as a planar ring disc coplanar with string 65a. On the inside, each eyelet 65b has a raised collar 65c surrounding an essentially cylindrical hole 65d. The hole 65d of each eyelet 65b is penetrated by one of the pins 61, which together constitute a pressure seat. Thus, pins 61 hold transducing element 65 in the middle between the two plate members 23. The portions of the two pins 61 disposed inside the two holes 65c of transducing element 65 constitute the points of application 61a, at which the force transmitting mechanism 21 applies a tension force to transducing element 65. FIGS. 3 and 5 also show a straight points-of-application-connecting line 71, which passes through the two points of application 61a or, more accurately, through the two centers of the sections of pins 61 seated in holes 65c of transducing element 65. Line 71 is identical to the line of intersection of the two planes of symmetry 29 and 31. Each eyelet 65b has attached thereto an electrical connector lug 65e projecting outwardly between the edges of the two plate members 23. Connector lugs 65e are connected by electrical conductors (not shown), such as insulated wires, with an electronic device 69 mounted inside housing 3 and comprising a circuit board fixedly attached to the lower part of housing 3.

String 65a is disposed within the plane of symmetry 31. On each side of plane 31 two parallelipiped-shaped permanent magnets 67 are disposed between the two plate members 23 and respectively inserted into recesses 23i thereof. Magnets 67 are so dimensioned, in a cross-section extending in the vertical plane 33, to make them closely fit into the space between the two opposed recesses 23i of each plate members 23, and are easily clamped in place between the recess bottom surfaces. Magnets 67 abut at least against those boundary surfaces 23n which are constituted by the longitudinal boundaries of recesses 23i disposed nearer the transducing element 65. Magnets 67 also rest against spacer noses 23p, on their sides facing toward the plane of symmetry 33. Thus, there is provided a free interspace both between the magnets 67 disposed on different sides of the plane of symmetry 31 and between the magnets 67 disposed on different sides of the plane of symmetry 33. Magnets 67 are magnetized in a direction perpendicular to the plane of symmetry 31 so as to have, on their sides facing the plane 31, a magnetic north pole and a magnetic south pole opposing each other. Thus magnets 67 generate, ignoring edge effects, magnetic fields crossing string 65a at right angles. Thus, the magnets 67 disposed facing toward each other with respect to the plane of symmetry 31 mutually attract each other and are pulled, by virtue of this force of attraction, toward the boundary surfaces 23n. Neighboring magnets 67 disposed on the same side of the plane of symmetry 31 have opposite polarity and are similarly attracted to each other and toward the spacer noses 23p serving as spacing means. Thus the four magnets 67 hold each other in position by virtue of the magnetic fields they generate, without any additional fastening means being provided. However, they alternatively can be additionally fastened to plate members 23 by adhesive bonding or the like.

At the reference member 41 and at the force input member 43, or more specifically, at the holes 23d aligned in pairs, there is provided a vibration damper 81 consisting of a circular disc of a diameter slightly larger than the diameter of the holes 23d. The thickness of vibration damper 81, as measured axially, is at least approximately equal to the distance between the two opposing surfaces of plate members 23. Vibration dampers 81 are fixedly mounted by glue to one or optionally both plate members. On each of the pins 61 is fastened at least one ring-shaped vibration damper 83. As shown, each damper 83 is pressed onto the pin between the eyelet 65b of the transducing element 65 and one of the plate members 23.

The two plate members 23 are rigidly connected and held together at eyelets 23r by pins 61. Furthermore, spacer bushings 25 ensure, even before force transmitting device 21 and force applying member 9 are fixedly mounted on the lower part 5 of housing 3 that plate members 23 will not become displaced relative to each other in the region of the reference member 41 and the force input member 43, or at most very slightly, in a direction parallel to the planes defined by the plate members. As soon as force transmitting device 21 and force applying member 9 are fixedly mounted on the lower part 5 of housing 3 by screws 35, the latter will rigidly connect the two plate members with each other, in the region of the reference member 41 and the force input member 43, respectively.

Plate members 23 and transducing element 65 consist of metallic, non-magnetic, elastically deformable materials, for example, a copper-beryllium alloy. Pins 61 consist of an electrically insulating, rigid material, such as a crystalline aluminum oxide (corundum), that preferably maintains its shape with only little change with the passage of time. The corundum may be provided as a glass-clear and colorless sapphire, or as a colored sapphire, or as a ruby. Vibration dampers 81, 83 consist of a rubber-elastic material, for example, a fluor elastomer supplied under the trademark VITON by E.I. du Pont de Nemours & Co., Inc.

Plate members 23 and transducing element 65 may be made, for example, of sheet metal or foils, using a film-etching or corroding process. Advantageously, pursuant to such a process, plate members 23 are made in mass-produced lots by first producing full, sheet-shaped rectangular sheet metal parts, sized for making at least one plate member 23 and preferably several, for example 100, plate members 23. Subsequently, the intended contours and holes are transferred from films, in a photographic process, onto both sides of a sheet metal part, and recess 23i is similarly transferred onto one side thereof. In addition, auxiliary connecting webs for holding together adjacent plate members are provided. The sheet metal part is then suspended in a bath of etching medium, so that the plate member contours and the holes will be etched out on both sides of the sheet metal part, and the recesses 23i on one side of the sheet metal part only. After removing the etched sheet metal part from the etching bath, the auxiliary webs connecting adjacent plate members are removed.

The plate members alternatively may be produced by stamping rather than etching. Advantageously, for example, pursuant to such a process, a full, strip-shaped sheet metal part is first produced, and the plate members stamped out therefrom one after the other. Recesses 23i are formed either in a pressing operation or in a machining operation which occurs after the stamping operation. The parts of the plate member sections 23b provided with recesses 23i are preferably transiently bent slightly toward that surface which, in the completed force transmitting mechanism, will face toward the opposing plate member. By such bending it is possible to produce an elastic pretension which is effective to clamp in position the permanent magnets 67 subsequently inserted in recesses 23i.

The transducing elements 65 may be similarly mass-produced by etching or stamping them out of full sheet-shaped or strip-shaped sheet metal parts. Collars 65c are produced by plastic deformation. Transducing elements 65 advantageously are produced by first applying the etching or stamping and plastic deformation processes to produce a workpiece having the shape shown in FIG. 6 and comprising, as a single piece, string 65a, eyelets 65b, and connectors 65e and an auxiliary connecting web 65f. Auxiliary web 65f facilitates transportation and assembly of the transducer element 65.

The assembly of force transmitting mechanism 21 advantageously is performed, for example, by first inserting one pair of pins 61, starting with their conical ends, into a plate member 23, then pressing vibration dampers 83 and the eyelets 65b of transducing element 65 onto pins 61, without removing the auxiliary connecting web 65f from transducing element 65. Subsequently, the second plate member 23 is pressed onto pins 61 such that the two plate members 23 have the prescribed distance therebetween. Auxiliary connecting web 65f can be separated from the two connectors 65e at prescribed separating places 65g, before or after pressing on the second plate member 23. As soon as plate members 23 are connected together by pins 61, the four permanent magnets 67 and the two spacer bushings 25 are set in place by temporarily elastically deforming plate members 23. Lastly, vibration dampers 81 are set and glued in place. Holes 23q serve as viewing windows, through which the positions of magnets 67 may be visually checked from the outside after they have been set in place.

String 65a is preferably rectangular in cross-section. The dimension of the cross-section measured perpendicular to the plane of plate member 23 is smaller than the dimension of the cross-section measured parallel to the plane of plate member 23. During force measurement, electronic device 69 supplies string 65a with a periodically varying (alternating current) electrical current. The forces produced by the electric current and the magnetic fields crossing string 65c induce the string to vibrate, during which spring 65a will be deflected in a direction perpendicular to the planes of FIGS. 1 and 3. As a consequence of the arrangement of magnets 67, string 65a will endeavour to vibrate at its second natural frequency. Electronic device 69, is equipped with conventional automatic control circuitry to regulate the frequency of the current passed through the string so as to ensure that string 65a does actually vibrate at its second natural frequency.

The distance between the centers of holes 65c of the transducing element 65 is, before assembly, and in its relaxed state, slightly smaller than the distance between the centers of holes 23s in plate members 23 in their similarly relaxed state, for example by 1% to 2% of the length of string 65a. If transducing element 65 is then held between plate members 23 by pin 61, then the elastic deformability of plate members 23, and particularly that of the plate member sections that constitute transmitting links 47, 49 and 51, 53, will result in an initial stressing of string 65a. In the following discussion, the value of the constant initial stress or force at rest as generated by the above described initial stressing of string 65a will be referred to as value $F_c$. It will furthermore be assumed that the load carrier, not shown in the drawing, of the weighing scale of the metering system, of which the force transducer described herein is a part, is effective to exert a force $F_1$ (see FIG. 2) onto force applying member 9, which in turn applies an input force $F_1$ on force input member 43 of force transmitting mechanism 21.

Figure 7:
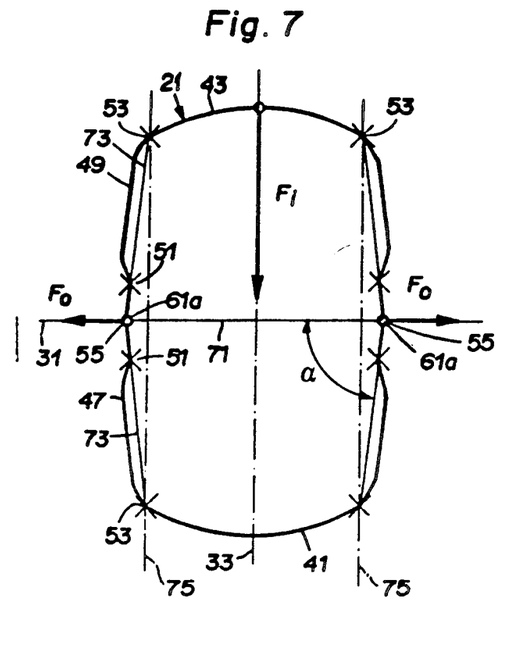
FIG. 7 is a diagrammatic illustration of the force transmitting mechanism of FIG. 1 showing its manner of operation.

The mode of operation of the force transmitting mechanism 21 will now be explained with reference to FIG. 7, in which reference member 41 mounted on housing 3, force input member 43 mounted on force applying member 9, and transmitting links 47, 49 are shown diagrammatically in full lines; joints 51, 53 are shown by crosses; and holders 55 and the points of application 61a by circles. FIG. 7 also shows the plane of symmetry 31 by a dash-dotted line, as well as the straight application-points-connecting line 71 that passes through the two points of application 61a. (Line 71 appears in this projection as coinciding with the symmetry plane 31.) Straight lines 73 are referred to in the following description as joint-connecting lines. Each such line 73 is associated with one of the transmitting links 47, 49, and is arranged to pass through the joints 51, 53 provided at the two ends of the associated transmitting link 47, 49, respectively. FIG. 7 also shows two planes 75 arranged to cross the plane of symmetry 31 and the straight points-of-application line 71, at right angles between the two points of application 61a. Each of the two planes 75 is arranged to pass through two bending joints 53 connected by transmitting links 47, 49 with the same point of application 61a.

Joint-connecting lines 73 each enclose with the application-points-connecting line 71 an angle alpha which is different from 90° and the same value for all four joint-connecting lines 73. Joint-connecting lines 73 associated with the two transmitting links 47 connecting reference member 41 with one eyelet 23r are inclined or diverge away from each other, when looking from joint 53 toward joint 51. The joint-connecting lines 73 associated with the two transmitting links 49 similarly diverge away from each other, when looking from joint 53 toward joint 51. Thus each joint 51 is spaced equidistantly from line 71, and is also spaced from the plane 75 extending through the joint 53 which is connected with the joint 51 by a transmission link, in the direction extending away from the plane of symmetry 33, and thus also from the point of application 61a not connected with the respective joint 51. Correspondingly, the distance measured parallel to plane 31 between the two joints 51 connecting the transmitting links 47 with the eyelets 23r and with the points of application 61a is larger than the distance measured parallel to plane 31 between the two joints 53 connecting the same transmitting links 47 with reference member 41. The same applies to joints 51, 53 provided at the ends of transmission links 49.

The input force $F_1$ applied by force applying member 9 to force input member 43 is substantially parallel to the planes of the plate members 23, and is directed vertically downward. Input force $F_1$ displaces force input member 43 parallel to the planes of the plate members 23 and toward reference member 41 fixedly mounted on housing 3. It is to be noted that the point of application of force $F_1$ and the counterforce transmitted to reference member 41 are actually applied to transmitting mechanism 21 at screws 35, and thus at locations disposed nearer to the plane of symmetry 31 and string 65a than the bending joints 53. Even though force $F_1$ and the aforementioned counterforce applied to reference member 43 are directed against each other, they act as tension forces in the plate members 23 between their holes 23a and bending joints 53. This contributes to preventing the plate members from bending out of planes defined in their state of rest.

The lengths of the four transmitting links 47, 49 remain during the displacement of force input member 43 at least approximately constant. A movement of force input member 43 toward reference member 41 is effective to deform and bend bending joints 51, 53, so that all four transmitting links 47, 49 become pivoted around the pivot axes of the joints 53 and away from the plane of symmetry 33. Inasmuch as the force $F_1$ exerts its action on force input member 43 in the plane of symmetry 33, it will be distributed, while transmitted, equally between the two transmitting links 49. Correspondingly, the two pins 61 will become displaced from their resting position by the same distance, parallel to the plane of the plate members 23, and thus parallel to the straight application-points-connecting line 71 and away from the plane of symmetry 33, so that the distance between the two points of application 61a will become somewhat larger, namely by the sum of the two displacement distances. This may be visualized as each half of string 65a being stretched by a force resulting from the transmission and transformation of half of force $F_1$. Thus, in addition to the constant prestressing or resting force $F_c$ generated by the initial elastic prestressing action, the points of application 61a will exert on string 65a a variable force $F_0$ proportional to the force $F_1$, so that the total force acting on string 65a will be equal to the sum $F_c + F_0$. In FIG. 7, the force $F_0$ is indicated by two arrows, each starting at one of the two points of application 61a. The forces applied to transducing element 65 at the two points of application 61a are tension forces substantially parallel to the planes defined by the plate members 23, and form an angle with force $F_1$. The forces applied to transducing element 65 at the two points of application 61a are at least approximately, and preferably exactly, parallel to the straight line 71 passing through the two points of application 61a; and, correspondingly, at least approximately, and preferably exactly, perpendicular to input force $F_1$.

The value of the ratio of variable force $F_0$ acting on transducing element 65 to input force $F_1$ exerted by the force input member 43 on force transmitting mechanism 21 is dependent on the value of the angle alpha. If angle alpha is larger than 45° and smaller than 90°, then force transmitting mechanism 21 causes a force reduction, so that $F_0$ will be smaller than input force $F_1$. In the embodiments shown in FIGS. 1 to 7, angle alpha has a value of approximately 84°. In the ideal case, in which transmitting links 47, 49 are perfectly rigid and have perfectly constant lengths; bending joints 51, 53 permit pivoting movements without resistance around pivot axes appearing, in a perpendicular plan view on the plate member planes, as dimensionless point-shaped axes; and the force transmission occurs with no displacement whatsoever and/or requires only infinitesimally small movements; then the transmission ratio would be expressed by the relationship $F_1/F_0 32 \tan(\text{alpha})$. In this ideal case, an angle alpha of 84° would yield a force reduction according to the ratio $F_0/F_1 = 9.5:1$. In an actual implemented force transmission mechanism 21, the angle alpha is approximately 84°. With this value of alpha, the force has been observed experimentally to be reduced by a factor of 9.1:1. This experimentally determined force transmission ratio corresponds to the transmission ratio that would result under "ideal" transmission conditions at an angle alpha of 83.73°.

It thus appears that the force transmission ratio $F_1/F_0$ obtained by the use of a force transmission mechanism of the same type as mechanism 21 can be adjusted to a specific desired value by suitably choosing the angle alpha. An angle alpha of 45°, for example, would yield a ratio of 1:1, assuming that the articulations were "ideal". Thus, if a force transmitting ratio of 1:1 is desired, the angle alpha should be selected to have a value of approximately 45°, with the exact value being determined empirically and/or by computations that account for the real or "non-ideal" behavior of the articulations. It is also possible to increase, rather than decrease, force $F_0$, and to thus obtain a ratio $F_1/F_0$ smaller than 1, i.e., a ratio $F_0/F_1$ larger than 1. This may be achieved by choosing the value of angle alpha to be less than 45°, but still greater than 0°.

While measuring the input force $F_1$ exerted on force input member 43, the frequency of vibration of string 65a may vary in a range between 10 kHz and 20 kHz, for example. Transmission links 47, 49 and joints 51, 53 are so dimensioned that together they function as low-pass filters having limit frequencies lying below the vibration frequency range of string 65a. The relatively narrow webs 23g contiguous with joints 53 also function as low-pass filters. Furthermore, the rubber-elastic vibration dampers 81, 83 are adapted to at least partially absorb and dampen vibrations of reference member 41, force input member 43 and pins 61. The points of application 61a at which force transmitting mechanism 21 exerts its action upon transducing element 65 are thus well decoupled or shielded from spacer bushings 25, at which force transmitting mechanism 21 is fastened to housing 3 and force applying member 9, with respect to vibrations, both bending vibrations parallel to the planes of plate members 23 and bending vibrations in the planes perpendicular to the planes of the plate members. Similarly, good decoupling is also obtained with respect to any longitudinal and/or torsional vibrations that might arise. This good vibration decoupling effect that insulates string 65a from housing 3 and from force applying member 9 on the one hand produces high quality string vibrations throughout the entire range of vibration frequencies, and, on the other hand, largely prevents the string vibrations from being disturbed by external shocks, disturbances, or the like.

The force transmitting mechanism 21 possesses only a relatively small mass. Correspondingly, those components of the force transmitting mechanism adapted to be "virtually" displaced and to perform the actual force transmission, also have small masses. Accelerations of the force transmitting mechanism caused by external shocks will thus yield only small forces, which also helps to keep any disturbing influences due to external shocks at a minimum.

Force transmitting mechanism 21 also is comparatively small in relation to the length of string 65a supported for vibration, and in relation to the values of the forces to be transmitted. In a practical implemented embodiment, the length of mechanism 21 is only approximately twice the length of string 65a, and the width of mechanism 21 is only 50% larger than the length of string 65a. Furthermore, the maximum dimension of the mechanism as measured perpendicular to the planes of the plate members is smaller than half of the length of the string. The thickness of plate members 23 is preferably at most 8%, and for example 5% to 6%, of the length of the part of transducing element 65 capable of vibrating, i.e. string 65a. Implemented embodiments of the force transmitting mechanism have the axes of the two pins 61 spaced apart by about 18 mm, for example, and the length of string 65a is about 15 mm. Plate members 23 advantageously then have a thickness between 0.5 mm and 1 mm, e.g., 0.8 mm. The distance between the opposing surfaces of plate members 23 advantageously is then approximately 2 to 2.5 mm, for example. Because two plate members spaced from each other and fixedly connected at certain locations are provided, there results a force transmitting device 21 having a relatively large stiffness against bending and/or torsional deformations that would cause sections of plate members 23 to be bent out of the resting state planes defined by plate members 23, notwithstanding the relatively small thickness dimension of the plate members. The maximum dimension of mechanism 23, measured perpendicular to the planes of the plate members is equal to the length of pins 61, which slightly protrude beyond the plate member sides facing away from each other; and has a value between 5 mm and 6 mm, for example.

As is evident from the above description, the force transmitting mechanism 21 serves not only to transmit force to transducing element 65, but also for supporting the latter and magnets 67. Nevertheless, mechanism 21 can be built from a small number of separate components. Not including screws 35, transducing element 65 and magnets 67, a force transmitting mechanism 21 may be made using no more than two each of the plate members 23, spacer bushings 25, pins 61, and vibration dampers 81 and 83. The components 23, 25, 61, 81 and 83 of mechanism 21 represent, however, pairs of identical components, so that only five different types of components are required for making the mechanism. The components pertaining to one mechanism 21, if mass-produced, can thus be economically manufactured and assembled.

A second embodiment of a plate member according to the present invention, generally denoted 123, will now be described with reference to FIG. 8, which only shows the inner surface that faces the transducing element and the opposing plate member. Plate member 123 is generally similar to plate member 23, except for the following differences. Plate member 123 comprises slot-shaped holes or openings 123d replacing circular holes 23d of plate members 23, which extend in a longitudinal direction parallel to the transducing element string, which is not shown in the drawing. Each hole 123d has enlarged end portions 123x. The slot-shaped openings 123e of plate member 123 differ from openings 23e of plate member 23 in that openings 123e do not have enlarged ends. Plate member 123 otherwise comprises recesses 123g corresponding to recesses 23g, with the difference that recesses 123g have no holes corresponding to holes 23h. Plate member 123 is also provided with two recesses 123i constituting two boundary surfaces 123m, 123n; two spacer noses 123p and two holes 123q.

Figure 9:
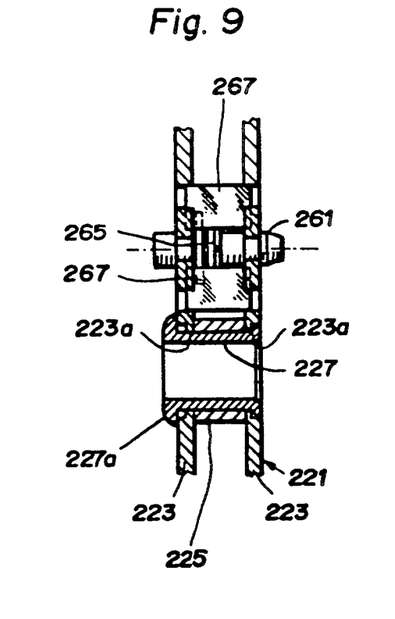
FIG. 9 is a partial cross-section, corresponding to that of FIG. 4, of a portion of a third embodiment of the force transmitting mechanism of the invention.

FIG. 9 partially shows a further force transmitting mechanism embodiment, generally denoted 221, which comprises two plate members 223 provided with two pairs of aligned holes 223a (only one pair is illustrated). A hollow cylindrical spacer bushing 225 is disposed between the two plate members 223 at each of the pairs of holes 223a. At each pair of aligned holes 223a a tubular rivet 227 penetrates the holes 23a and the spacer bushing 125 to fixedly connect the two plate members 223 with each other. Tubular rivet 27 comprises a head 227a. Also shown in FIG. 9 are a pin 261, a transducing element 265 and permanent magnets 267 similar to pin 61, transducing element 65 and magnets 67, respectively.

Figure 10:
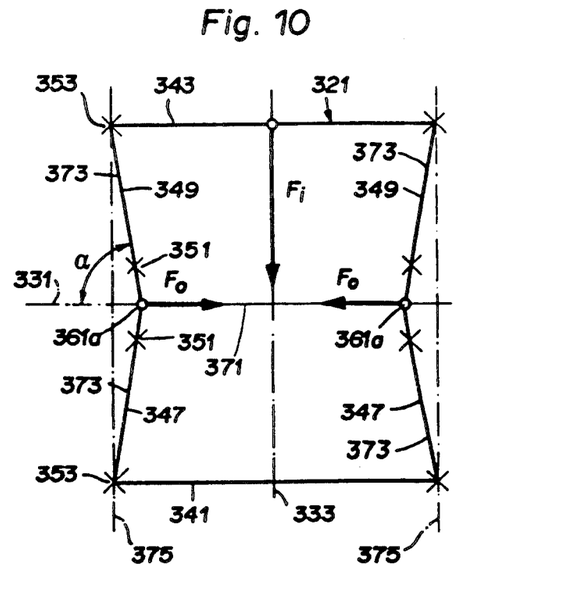
FIG. 10 is a diagrammatic illustration, analogous to FIG. 7, showing the manner of operation of another embodiment of the force transmitting mechanism of the invention.

FIG. 10 is a diagrammatic illustration similar to FIG. 7 representing a still further force transmitting mechanism embodiment 321 disposed mirror-symmetrically with respect to planes of symmetry 331 and 333 corresponding to the planes of symmetry 31 and 33 of FIG. 7. Mechanism 321 comprises two plate members connected with each other. These two plate members constitute together a reference member 341, a force input member 343, two elongated transmitting links 349, two bending joints 351 and two bending joints 353. Mechanism 321 also comprises supports with two pins constituting two points of application 361a at which mechanism 321 engages a transducing element not shown in the figure. FIG. 10 also shows the application-points-connecting line 371 that passes through points of application 361a and is contained in the plane of symmetry 331, and the joint-connecting lines 373 that coincide with the lines representing the transmitting links. FIG. 10 also shows two planes 375 corresponding to the planes 75 of FIG. 7 and enclosing a right angle with the straight points-of-application-connecting line 371.

Mechanism 321 is substantially similar to mechanism 21, except that mechanism 321 has a different arrangement of the transmitting links and of the joint-connecting lines associated therewith. Specifically, the joint-connecting lines 373 associated with the two transmitting links 347 are tilted away from each other when looking from joints 351 toward joints 353. The same applies to the joint-connecting line 373 associated with transmitting links 349. The two points of application 361a are thus located between the two planes 375.

If an input force $F_1$ applied to force input member 343 pushes the input member against reference member 341, then the two points of application 361a are pushed toward each other by forces equal to $F_0$. The value of the ratio $F_0/F_1$ will in turn be determined by the value of the angle alpha included by the line 371 and one of the lines 373, respectively. It is noted that, in FIG. 10, the angle alpha is shown included between segments of the aforementioned lines in a way to have its value larger than 0° but smaller than 90°, as in FIG. 7.

If mechanism 321 supports a string acting as transducing element 365, and input force $F_1$ acts on force input member 343 in the direction shown in the drawing, then the force acting on the string will be equal to the difference between the constant prestress or force at rest $F_c$, and the variable force $F_0$ proportional to the input force $F_1$. In this case it is necessary to have force $F_c$ made larger than the maximum value of force $F_0$ that will occur during measurement, within the design range of measurement, so that the difference $F_c - F_0$ will always have a positive value, i.e., it will always be a tension force stretching the string.

It is of course possible to have force input member 343 receive an input force $F_1$ which is directed away from the reference member 341. Such a force would then apply at the points of application 361a tension forces acting on the string and directed away from the plane of symmetry 333. Furthermore, it is also possible to use a transducing member comprising a piezoelectric element, as mentioned in the introduction. An element of this type advantageously is acted upon by compression forces at the points of application, and thus is advantageously configured to have a shape adapted to be acted upon by compression forces. Thus, when using a piezoelectric element as the transducing element, the forces applied to it at the points of application are advantageously directed toward each other, as shown in FIG. 10. It will also be appreciated that force transmitting mechanism 21 is equally suited to have the applied forces $F_1$ and $F_0$ reversed in direction.

Figure 11:
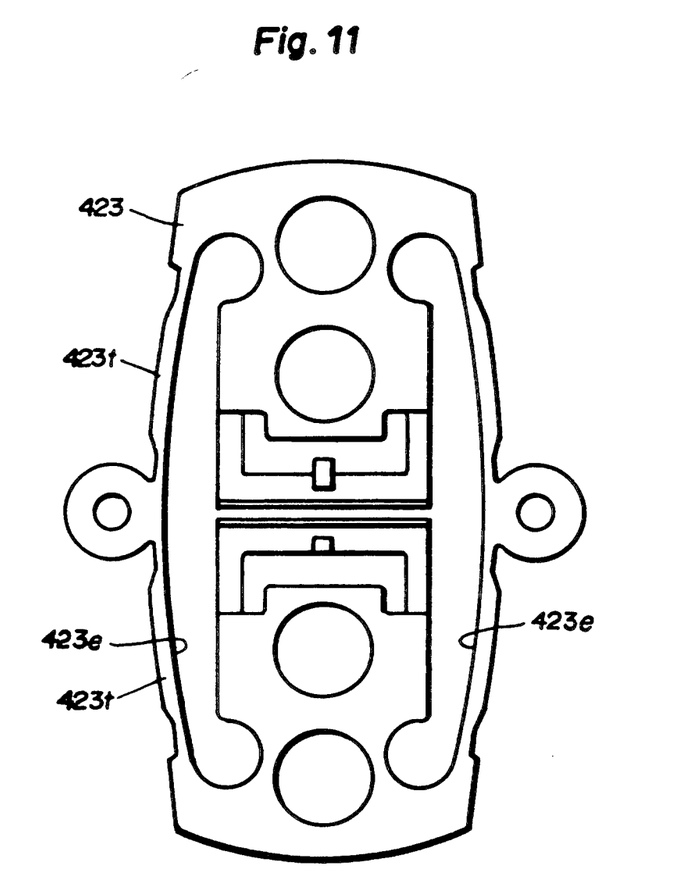
FIG. 11 is a plan view, similar to FIG. 8, of a further embodiment of the force transmitting mechanism of the present invention.

The further plate member embodiment 423 shown in FIG. 11 is largely similar to plate member 23, except that webs 423, which are shown in plan view in FIG. 11, do not have straight inner side edges. Rather, the inner side edges, defined by the outer edge of elongated slots 423e, are slightly convexly curved, as shown. Similarly to plate members 23, two plate members 423 are connected with each other and with the transducing element, whereby each pair of overlapping webs constitutes a transmitting link.

As specified before, the force transducers of the present invention are intended for us in conjunction with metering or proportioning systems comprising, for example, a conveyor type scale; or a system adapted to operate gravimetrically. The load to be weighed may be transmitted by the load carrier or by the material storage device of such a metering system either to one force transducer or distributed over several, for example three, force transducers. Furthermore, in such metering systems it is advantageous to connect an auxiliary external electronic control device either to the electronic device for the force transducer, or group of transducers, or directly to the electrical output from the transducer(s), for controlling the delivery of conveyed material according to a desired set point value based on comparisons of the set point value with the amount of material being conveyed calculated using measurements obtained with the force transducer output(s).

The force transducer of the present invention may also be used in conjunction with scales adapted to measure masses, independent of the value of the gravitational constant or acceleration at the place of measurement. A scale intended for this purpose advantageously is equipped with two force transducers, each provided with a string as the transducing element. The force input member of one force transducer is connected with the load carrier, and the force input member of the other force transducer is connected to a reference mass, in a manner analogous to the manner in which one string of a scale with two strings, as is known in the art, is connected with a reference mass.

It will also be appreciated that the features of the various embodiments disclosed herein can be combined with each other by referring to the figures of the drawing. Also, two permanent magnets can be used instead of four, in which case the string 65a advantageously is caused to vibrate at its first natural frequency. It is also possible to connect only one of the two points of application with the reference member and the force input member, respectively, by using one transmitting link having two joints provided at its ends, to render the point of application in question displaceable in response to a displacement of the force input member. If, for example, it is desired to change the force transmitting device illustrated in FIG. 3 to have only the point of application at the right displaceable along the points-of-application-connecting line, i.e. along string 65a, then for this purpose the two joints 51 that connect the two transmission links 47, 49 located at the left, with the point of application 61a similarly located at the left, and optionally the joint 53 located between the reference member 41 and the transmission link 47 located in the lower left quadrant of the Figure, are replaced by rigid connections.

If the transmitting links are elongated and curved, as is the case with a force transmitting device comprising plate members of the type shown in FIG. 11, it is possible to dispense with the bending joints provided at the ends of the transmitting links, and to design the transmitting links in their entirety so as to enable them to be bent by elastic deformation to a greater or lesser degree along their entire length within the planes of the plate members.

While there are shown and described present preferred embodiments of the invention, it is to be distinctly understood, that the invention is not limited thereto but may be otherwise variously embodied and practiced without departing from the scope of the present invention.

What is claimed is:

1. A force transducer comprising:
   transducing element for transducing a force into an electrical signal; and
   force transmitting apparatus for transmitting an input force to said transducing element, the force transmitting apparatus comprising:
   a reference member;
   a force input member movable with respect to said reference member;
   two spaced holders in engagement with said transducing element; and
   first and second transmitting links movably connecting a first one of said holders with said reference member and said force input member, respectively, such that a change in distance between respective first ends of said first and second transmitting links remote from said first one of said holders causes a change in the distance between said holders; and
   two unitary plate members disposed in spaced, parallel relationship, and joined together at predetermined locations, each plate member having a first section associated with said force input member, second and third sections respectively associated with each of said holders, and fourth and fifth sections respectively associated with each of said transmitting links.

2. The force transducer as claimed in claim 1, wherein: each of said holders comprises a pin mounted in a hole provided in each of said plate members; and said transducing element has a unitary construction comprising:
an elongated intermediate main section disposed in the space between said plate members; and
an eyelet section at each end of said main section and formed integrally therewith, each of said eyelet sections being fastened to a respective one of said pins.

3. The force transducer as claimed in claim 2, wherein said eyelet sections each include a hole which receives said respective one of said pins.

4. The force transducer as claimed in claim 2, wherein:
said plate members and said transducing element are metallic and electrically conductive;
said pins are electrically insulative; and
said transducing element is mounted on said pins so as to be electrically insulated from said plate members.

5. The force transducer as claimed in claim 4, wherein said pins are made of corundum.

6. The force transducer as claimed in claim 5, wherein:
a vibratable string constitutes said transducing element main section
at least one first magnet associated with said reference member and at least one second magnet associated with said force input member are disposed in the space between said two plate members with at least the sides of said first and second magnets which face said string in abutting relationship with boundary surfaces formed in the opposing surfaces of said plate members.

7. The force transducer as claimed in claim 6, wherein edges of recesses in which said first and second magnets are seated constitute said boundary surfaces.

8. The force transducer as claimed in claim 6 having two first and two second magnets and spacing means formed in said plate members for positioning said first and second magnets in spaced relation to each other.

9. The force transducer as claimed in claim 6, further comprising:
a first rubber elastic vibration damper associated with said reference member;
a second rubber elastic vibration damper associated with said force input member; said first and second vibration dampers being fastened to at least one of said plate members; and
at least one rubber elastic ring-shaped vibration damper mounted on each of said pins between said transducing element and at least one of said plate members.

10. The force transducer as claimed in claim 1, wherein:
each of said transmitting links is connected at a first end thereof with one of said holders by a bending joint, and at a second end with the associated reference member/force input member by a further bending joint, such that a straight line connecting two bending joints connected with the same transmitting link forms an angle not equal to 90° with a straight line passing through said holders, so that an input force applied to said force input member results in said holders applying to said transducing element a force forming an angle with the input force and being related thereto;
said bending joint are formed by constricted regions in said fourth and fifth sections of each of said plate members, said plate members being configured and arranged in mirror symmetry relative to a plane of symmetry passing therethrough.

11. The force transducer as claimed in claim 1, further comprising:
a first pair of aligned holes associated with said reference member respectively formed in said plate members;
a second pair of aligned holes associated with said force input member respectively formed in said plate members;
a spacer bushing interposed between each of said first and second pairs of aligned holes for maintaining the spacing between said plate members at a predetermined distance;
first fastening means for fastening said reference member to a base which is stationary during measurement, said first fastening means being adapted to pass through said first pair of holes and the space bushing associated therewith; and
second fastening means for fastening said force input member to an input force applying member which is movable during measurement, said second fastening means being adapted to pass through said second pairs of holes and the spacer bushing associated therewith.

12. The force transducer as claimed in claim 11, wherein:
said spacer bushings have collars extending into the respective first and second pairs of holes, and shoulder surfaces abutting against the opposing surfaces of said plate members; and
screws constitute said first and second fastening means.

13. The force transducer as claimed in claim 11, wherein:
both holders are movably connected with said reference member and said force input member by respective elongated transmitting links and bending joints at both ends of said transmitting links, said transmitting links and bending joints being formed in said plate members; and
said first and second pairs of holders are located nearer to a straight line passing through the two holders than to the joints connecting said reference member and said force input member with said transmitting links.

14. The force transducer as claimed in claim 13, wherein:
each plate member is formed with a slot defining said first and second transmitting links; and
two additional pairs of aligned holes are formed in the respective plate members adjacent and aligned with said first and second pairs of holes, respectively, such that said first and second pairs of holes are interposed between said additional pairs of holes and said transducing element, said additional holes delimiting with opposing ends of said slot narrowed web regions in each of said plate members.

15. A method of producing a force transducer as claimed in claim 1 comprising the steps of:

producing each plate member from a full sheet-metal part by one of the processes in the group consisting of etching and stamping; and joining said plate members together with said transducing element disposed therebetween.

16. A force transducer for transducing a force into an electrical signal comprising:
a force transmitting mechanism and a transducing element; said force transmitting mechanism comprising:
   a reference member fixedly mounted on a base member held stationary during the force measuring process;
   a force input member movably connected with said reference member to which an input force is applied;
   transmitting linkage means for applying a force related to the input force at two spaced points of application to said transducing element so as to be transduced into an electrical signal by said transducing element;
   means defining a pair of aligned spaced holes at each point of application; and
   a pin made of an electrically insulating crystalline material press-fitted into each of said pairs of aligned spaced holes; and
said transducing element having a unitary, metallic, electrically conducting construction comprising:
   an elongated main section; and
   an eyelet section at each end of said main section through which a respective one of said pins passes by press-fitting.

17. A force transducer as claimed in claim 16 wherein said pins are made of corundum.

18. A force transducer comprising:
a reference member fixedly mounted on a base member held stationary during the force measuring process;
a force input member movably connected with said reference member to which an input force is applied;
force transmitting means for exerting a force related to the input force on a transducing element at two spaced points of application; at least one of said points of application being movable with respect to said reference member;
means defining a pair of aligned spaced holes at each point of application;
a pin made of an electrically insulating crystalline material fixedly mounted by press-fitting in each of said pairs of aligned spaced holes; and
said transducing element having a unitary, metallic, electrically conducting construction comprising:
   an elongated main section; and
   an eyelet section at each end of said main section through which a respective one of said pins passes by press-fitting.

19. The force transducer as claimed in claim 18 wherein said pins are made of corundum.

* * * * *